United States Patent
Giefer

(12) 
(10) Patent No.: US 6,386,061 B1
(45) Date of Patent: May 14, 2002

(54) SELECTOR DEVICE FOR THE GEARBOX OF A MOTOR VEHICLE

(75) Inventor: Andreas Giefer, Lemförde (DE)

(73) Assignee: ZF Lemförder Metallwaren AG (DE)

( * ) Notice: Subject to any disclaimer, the term of this patent is extended or adjusted under 35 U.S.C. 154(b) by 0 days.

(21) Appl. No.: 09/600,812

(22) PCT Filed: Nov. 22, 1999

(86) PCT No.: PCT/DE99/03705

§ 371 Date: Jul. 21, 2000

§ 102(e) Date: Jul. 21, 2000

(87) PCT Pub. No.: WO00/30885

PCT Pub. Date: Jun. 2, 2000

(30) Foreign Application Priority Data

Nov. 23, 1998 (DE) .......................... 198 53 934

(51) Int. Cl.[7] .............................. F16H 59/02
(52) U.S. Cl. ................. 74/473.18; 74/473.19; 74/473.33; 74/900
(58) Field of Search .............. 74/473.18, 473.19, 74/473.33, 900

(56) References Cited

U.S. PATENT DOCUMENTS 3,975,970 A * 8/1976 Elfes et al. ................ 74/473.1
5,357,820 A * 10/1994 Moroto et al. ............. 74/335
5,415,056 A * 5/1995 Tabata et al. ............... 74/335
5,566,583 A * 10/1996 Suzuki .................... 74/473.21

FOREIGN PATENT DOCUMENTS

| DE | 24 333 | 1/1994 |
| DE | 43 32 265 | 5/1995 |
| EP | 0 279 087 | 8/1988 |

OTHER PUBLICATIONS

F. Kükükay and J. Neuner, 1994 pp. 512–517 Die Neue äussere Schaltung von BMW Für Automatikgetriebe ATZ Automobiltechnische Zeitschrift 96 (1994).

* cited by examiner

*Primary Examiner*—Allan D. Herrmann
(74) *Attorney, Agent, or Firm*—McGlew & Tuttle, P.C.

(57) ABSTRACT

A shifting device of a motor vehicle transmission with a selector lever (3) and a kinematic elements (4–9) for transmitting the selection movements to the automatic transmission, wherein the selector lever can be moved in an automatic shift gate for selecting automatic gears and in a sequence shift gate for manually upshifting and downshifting gears. The shifting device (1) has three movement spaces (I, II, III), which are located next to one another and are preferably directed essentially in parallel to one another, and two adjacent movement spaces (I, II and/or II, III) each are provided for different functions.

23 Claims, 12 Drawing Sheets

SELECTOR DEVICE FOR THE GEARBOX OF A MOTOR VEHICLE

DESCRIPTION OF THE PREFERRED EMBODIMENTS

Referring to the drawings in particular, FIGS. 1 through 5 show different 3D views of a preferred exemplary embodiment of the shifting device according to the present invention with different positions of the selector lever 3. The design of this shifting device with its kinematically effective elements is symmetrical to planes through the shifting device, which extend in the longitudinal direction of the vehicle and at right angles thereto.

The shifting device 1 comprises essentially a central carrier 6, which is mounted in a housing, which is shown only partially by 2.1–2.5, around a selector axis 9 extending in the longitudinal direction of the vehicle. The central carrier 6 has a cutout 6.1 on both longitudinal sides for a mounting insert 11. The central carrier 6 is laterally surrounded by a U-shaped, inner bridge 4, which has on both sides a round axial opening 4.1, which is engaged by the mounting insert 11 with the axial element 11.1, so that the inner bridge is rotatably movable around the axis formed by the mounting insert 11. The mounting inserts 11 arranged on both sides on the central carrier 6 thus generate a first shift axis 7, around which the inner bridge 4 can be pivoted. In addition, there is a pivoting possibility of the central carrier 6 around the selector axis 9 extending at right angles to the shift axis 7 within the housing.

The inner bridge 4 is itself surrounded in turn by an outer bridge 5, and the inner and outer bridges 4 and 5 are connected to one another in the upper area rotatably movably by the second shaft axis 8. A selector lever 3 with a shift knob 17 is connected to the inner bridge 5. Furthermore, the outer bridge 5 has one locking element 12.1 and 12.2 each on both sides in the lower area, which engage each locking element engagements 2.1 and 2.2 arranged on both sides on the housing in the middle position, and the locking element engagements 2.1 and 2.2 are parts of the housing, which is rigidly connected to the vehicle. The locking elements 12.1 and 12.2 and the locking element engagements 2.1 and 2.2 are arranged on the outer bridge 5 such that when they are engaged, they extend concentrically with the first shift axis 7. Consequently, if the selector lever 3 and consequently the outer bridge 5 are in the middle movement space, a pivoting movement of the selector lever 3 in the longitudinal direction of the vehicle is transmitted via the outer bridge 5 and via the second shift axis 8 to the inner bridge 4, which will now likewise be pivoted around the first shift axis 7. If a sideways movement of the selector lever 3 takes place, the locking elements 12.1 and 12.2 become disengaged from the locking element engagements 2.1 and 2.2, so that a pivoting movement of the selector lever 3 in the longitudinal direction of the vehicle is no longer transmitted as a rotary movement around the first shift axis to the inner bridge 4, but it leads only to a rotary movement of the outer bridge 5 around the second, upper shift axis 8. To disengage the locking elements 12.1 and 12.2 from the locking element engagements 2.1 and 2.2, it is irrelevant in this case whether a pivoting movement of the selector lever takes place to the right or to the left.

Consequently, three different movement spaces are thus formed for the selector lever 3 with different kinematic effects, wherein two adjacent movement spaces each are to be assigned to different functions. The selector lever 3 can be moved forward and backward in the direction of the vehicle in the middle movement space, as a result of which pivoting of the inner bridge 4 around the first shift axis 7 is generated. If the selector lever 3 is deflected sideways, a fundamentally new kinematic situation arises on both sides, because the inner bridge 4 is now stopped despite a pivoting movement in the longitudinal direction of the selector lever 3 and only a pivoting movement of the outer bridge 5 around the second, upper shift axis 8 takes place. Consequently, three movement spaces have been created, which can have at least two fundamentally different functions. As is shown in this exemplary embodiment, it is possible in the middle movement space to connect the lower arm of the inner bridge 4 to a cable or a linkage 18, which transmits the pivoting movement in the middle movement space to an automatic transmission. The selection of the different gears of an automatic transmission is usually controlled by this movement. Furthermore, both the right-hand movement space and the left-hand movement space of the selector lever 3 can be used to trigger the sequence shifting of an automatic transmission. Mostly electronic sensors, which respond, e.g., exclusively to a relative movement between the inner bridge 4 and the outer bridge 5, are used for this purpose as electronic transmission devices for transmitting shifting movements of the selection lever 3 to the transmission. However, it is also possible to arrange sensors, e.g., in the cover, and to forward the movement information electronically from there. Since the shifting movements of the selector lever in the lateral movement spaces do not induce any movements of the inner bridge 4, the cable connection to the transmission may also remain engaged despite shifting movements of the selector lever without triggering shifting operations via the cable. The possibility of movement of the outer bridge 5 is guaranteed by an elongated hole in the axial element 11.1.

For better guiding and for limiting the movement spaces of the selector lever 3, guide elements 2.3 through 2.5, which are rigidly connected to the housing, which is shown only partially, are additionally provided in the exemplary embodiment shown. The guide elements 2.3 and 2.4 represent a movement shaft acting in both directions, into which the inner and outer bridges 4 and 5 can be introduced by laterally pivoting the selector lever 3. If the selector lever 3 and consequently the inner and outer bridges 4 and 5 are in a lateral position, the respective guide elements 2.3 and 2.4 prevent the inner bridge 4 from tilting, while the outer bridge 5 continues to be movable around the second shift axis 8. In addition, the guide of the selector lever 3 is still guided by the guide elements 2.5.

The selector lever 3 is in the middle position in the middle movement space in FIG. 1.

Figure 1:
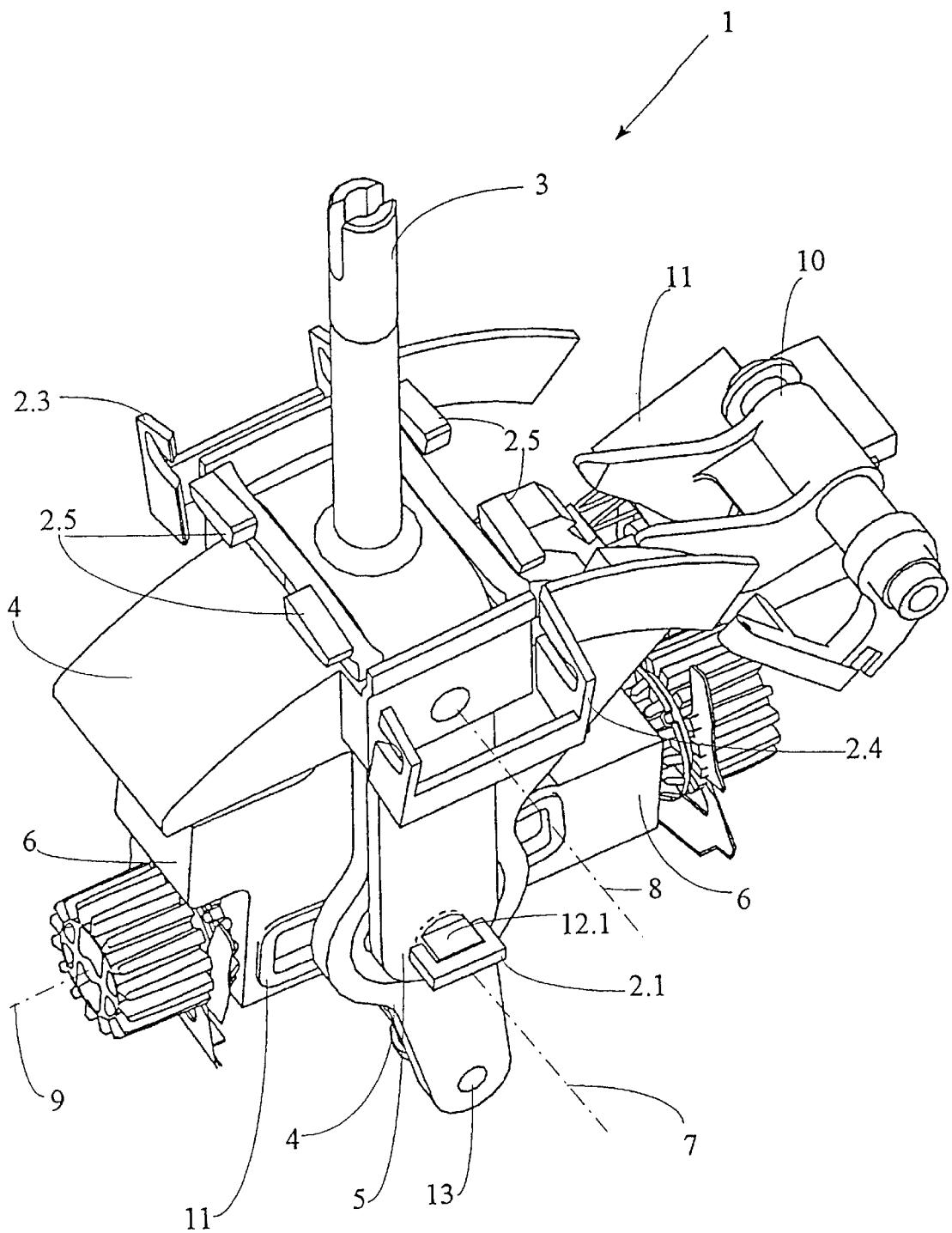
Figure 2:
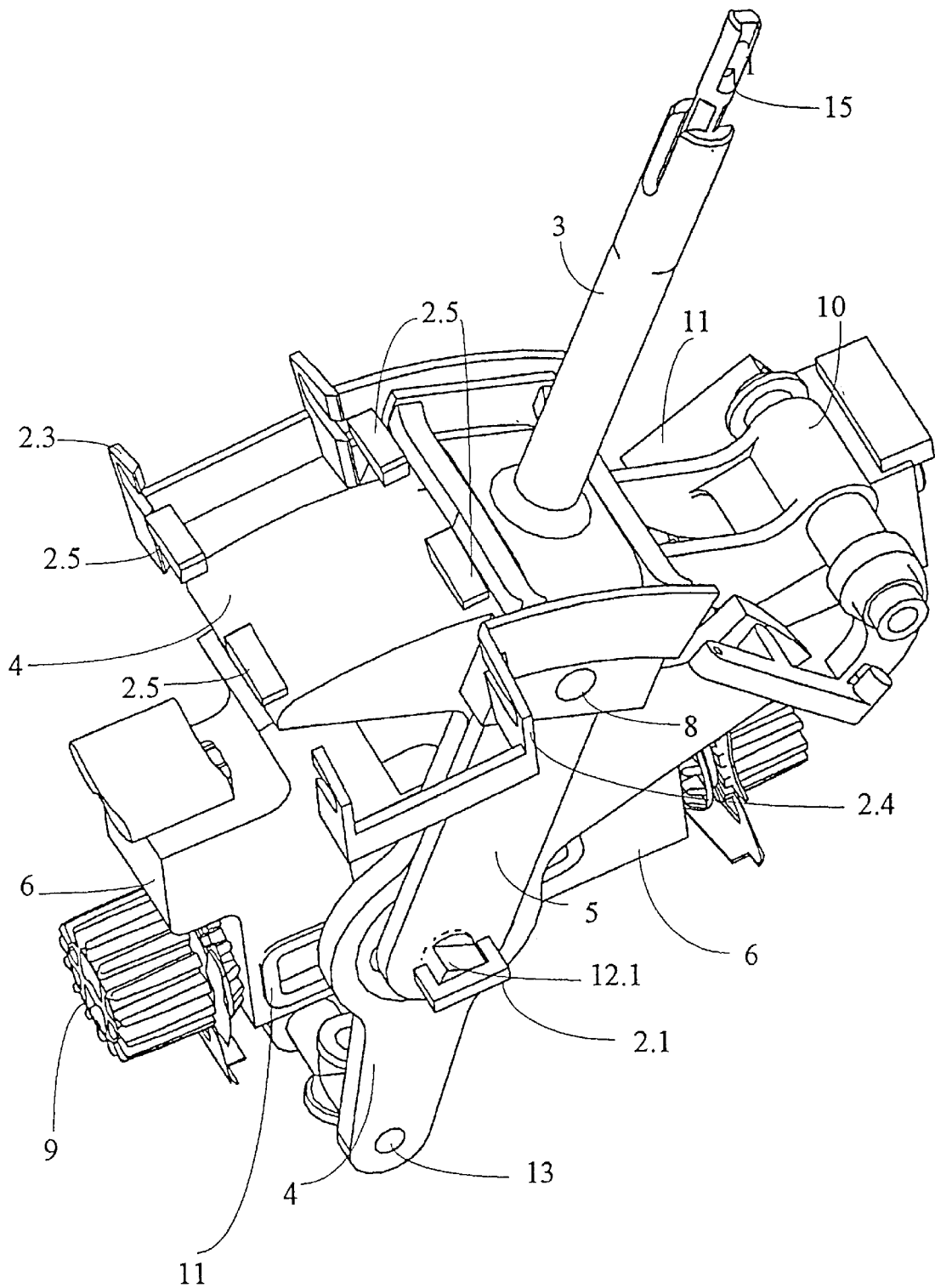
FIG. 2 shows the same view as FIG. 1, but the selector lever 3 is in the middle movement space in a front position. This corresponds to position "P" of the automatic transmission.
Figure 3:
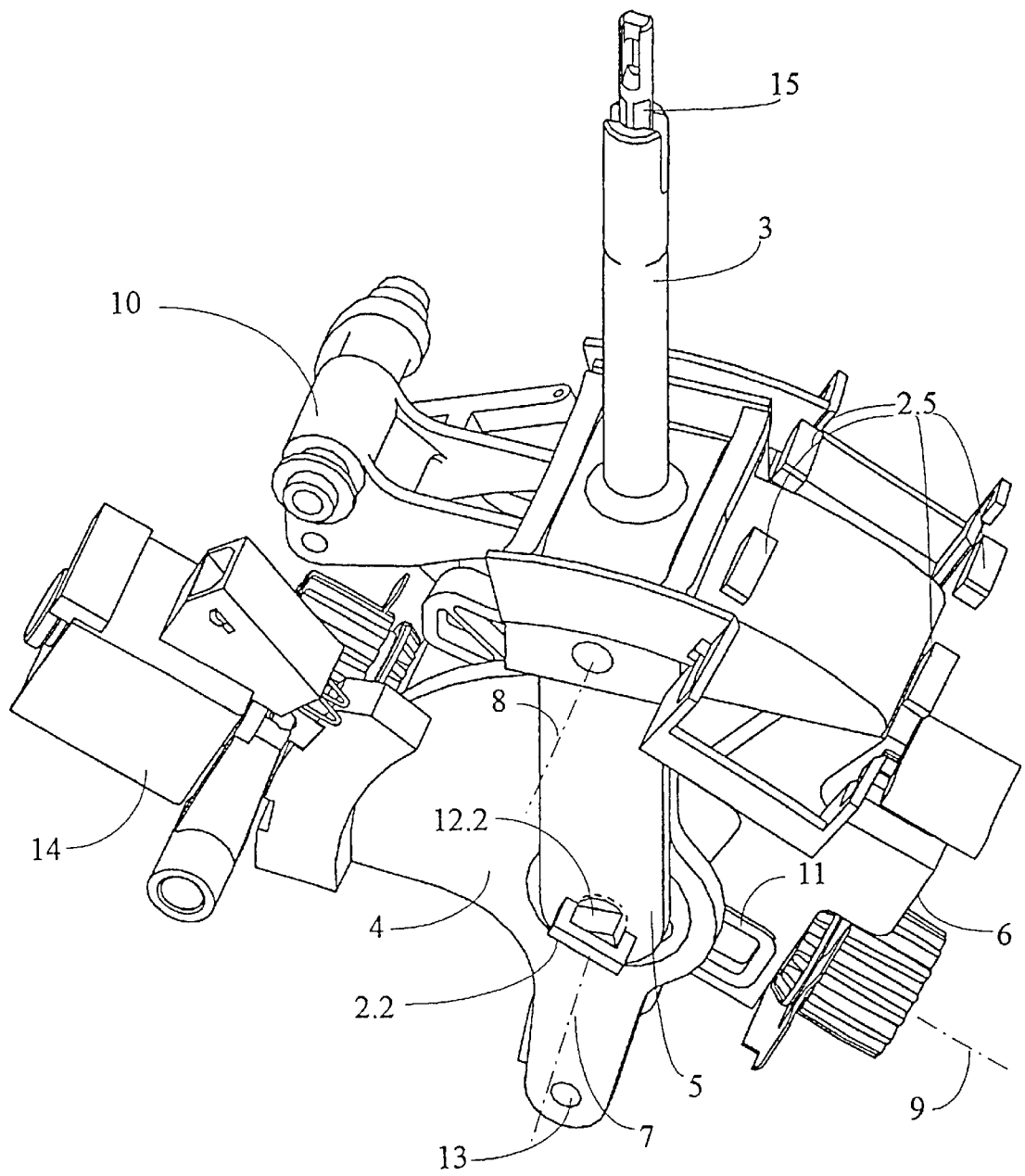
FIG. 3 shows the shifting device 1 with the selector lever 3 in the same position as in FIG. 2, but from the opposite side.
Figure 4:
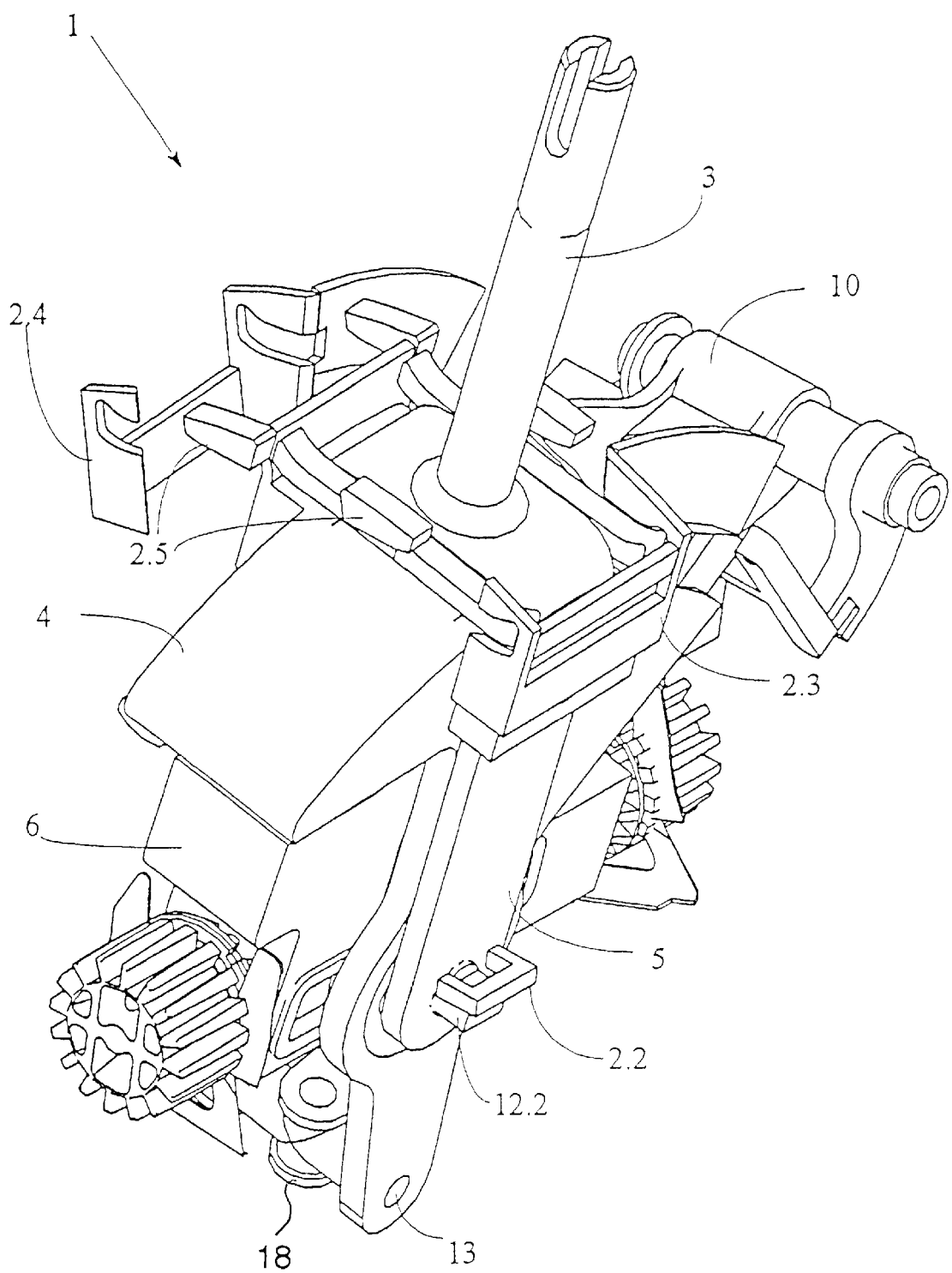
Figure 5:
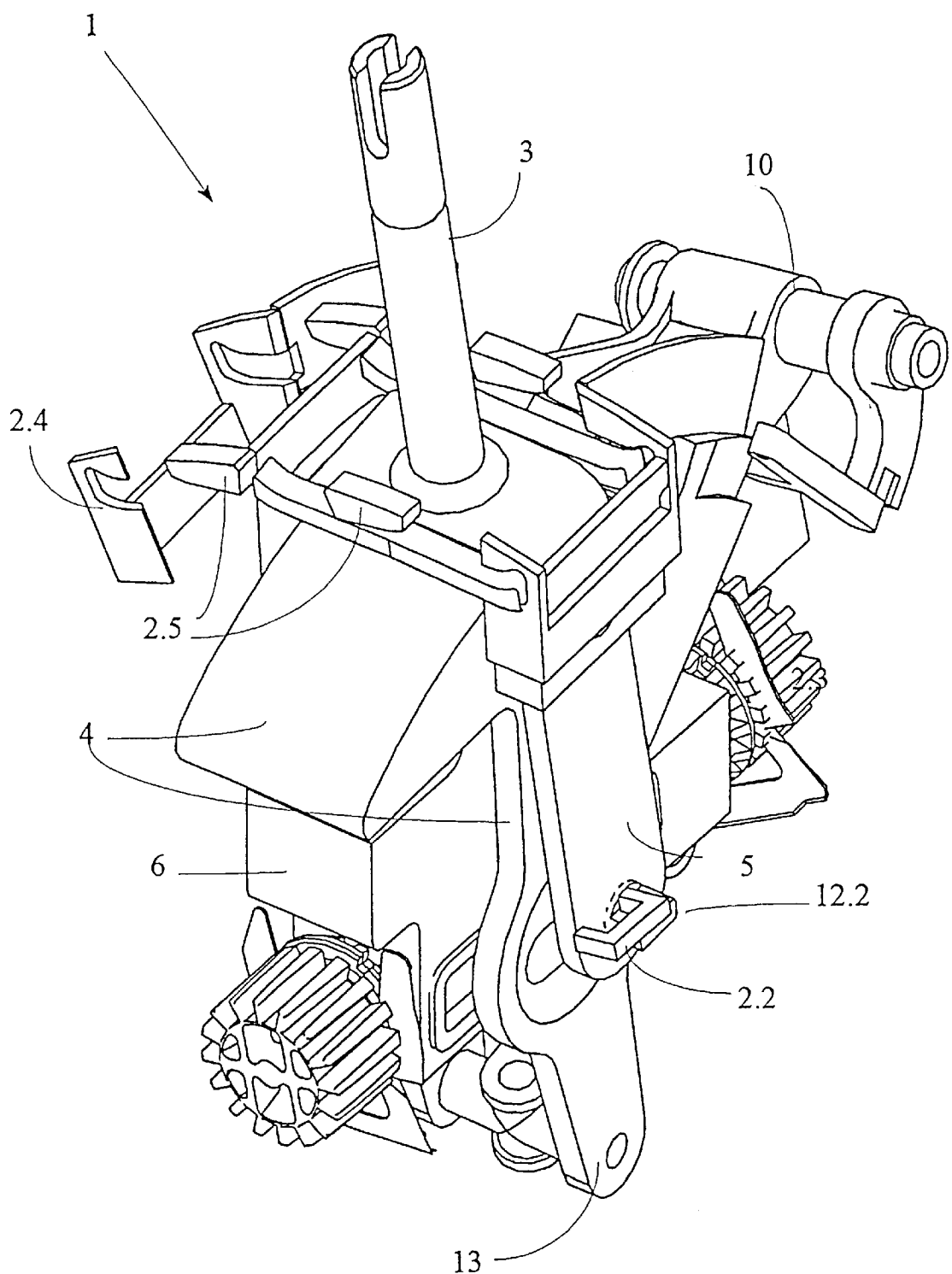

FIG. 4 shows the shifting device 1 with the selector lever 3 in a lateral movement space, i.e., in a sequence shift gate in this case, wherein the selector lever 3 is in the middle position in terms of its pivoting movement in the direction of the vehicle. It can be clearly recognized that the locking element 12.2 has been disengaged from the locking element engagement 2.2, so that the outer bridge 5 can be pivoted around the second shift axis 8 and is also pivoted relative to the inner bridge 4 in this example.

In addition, a "Key Lock" system 10 and a "Shift Lock" system 14 are also shown in FIGS. 1 through 5. Both systems have been known per se from the prior art, e.g., from the Applicant's patent application Ser. No. DE 197 56 034, whose disclosure content is herewith taken over into the application (hereby incorporated by reference), and their functions will not therefore be described in detail.

For illustration, FIGS. 6 through 9 show once again different 3D views of the cooperation between the inner bridge 4 and the outer bridge 5 and the guide parts 2.3 through 2.5 of the housing.

Figure 6:
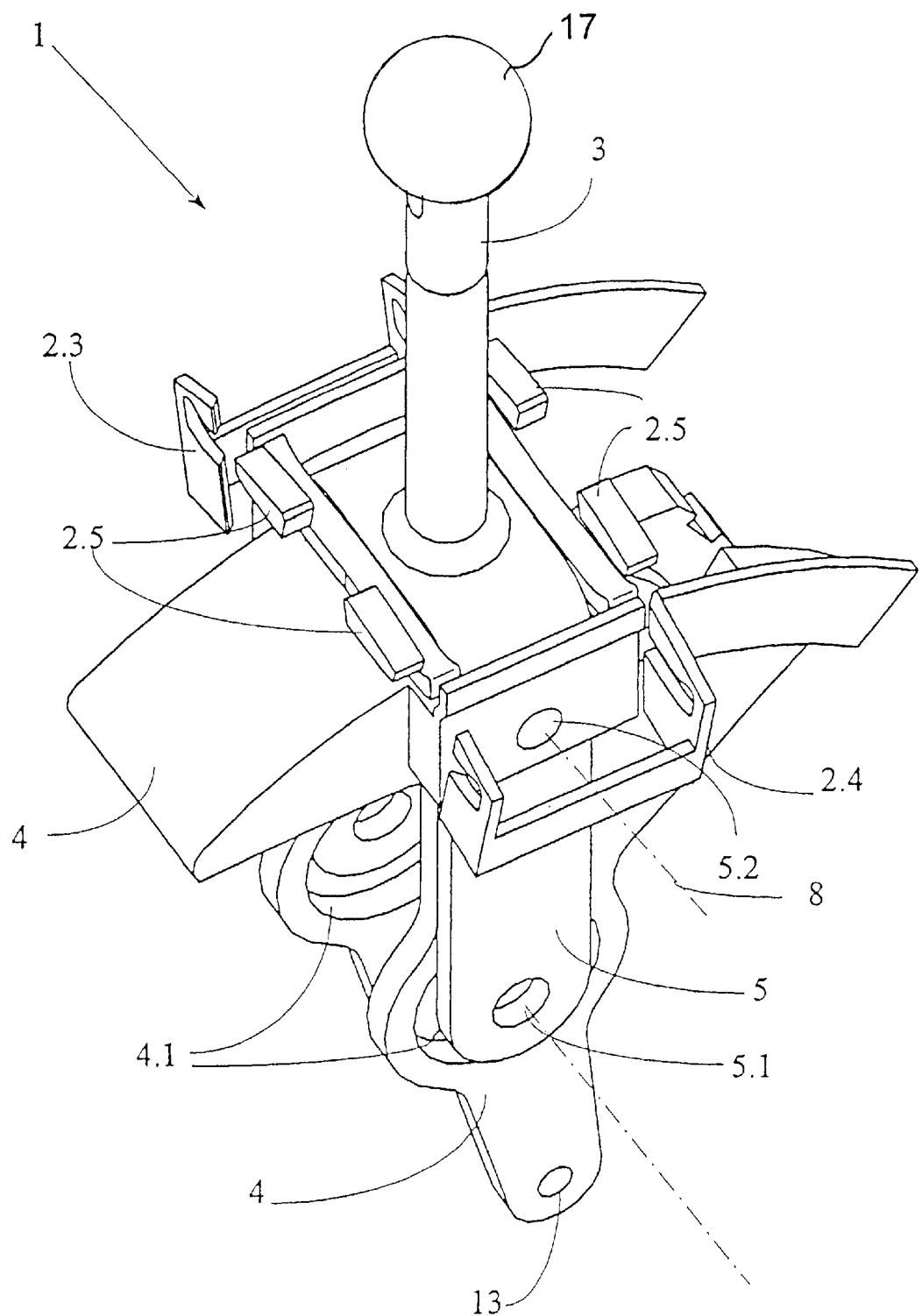

FIG. 6 shows the inner bridge 4 with the two axial openings 4.1, which is engaged in the assembled state by the axial element 11.1 of the mounting insert 11. The outer bridge 5 surrounds the inner bridge 4, and the two arms of the bridges also have in the lower area an axial opening 5.1, into which the locking elements 12.1 and 12.2 can be inserted, and these locking elements will then optionally cooperate with the locking element engagements 2.1 and 2.2 of the housing. In this representation, the selector lever 3 is in the middle movement space, which corresponds mostly to the automatic shift gate.

Figure 7:
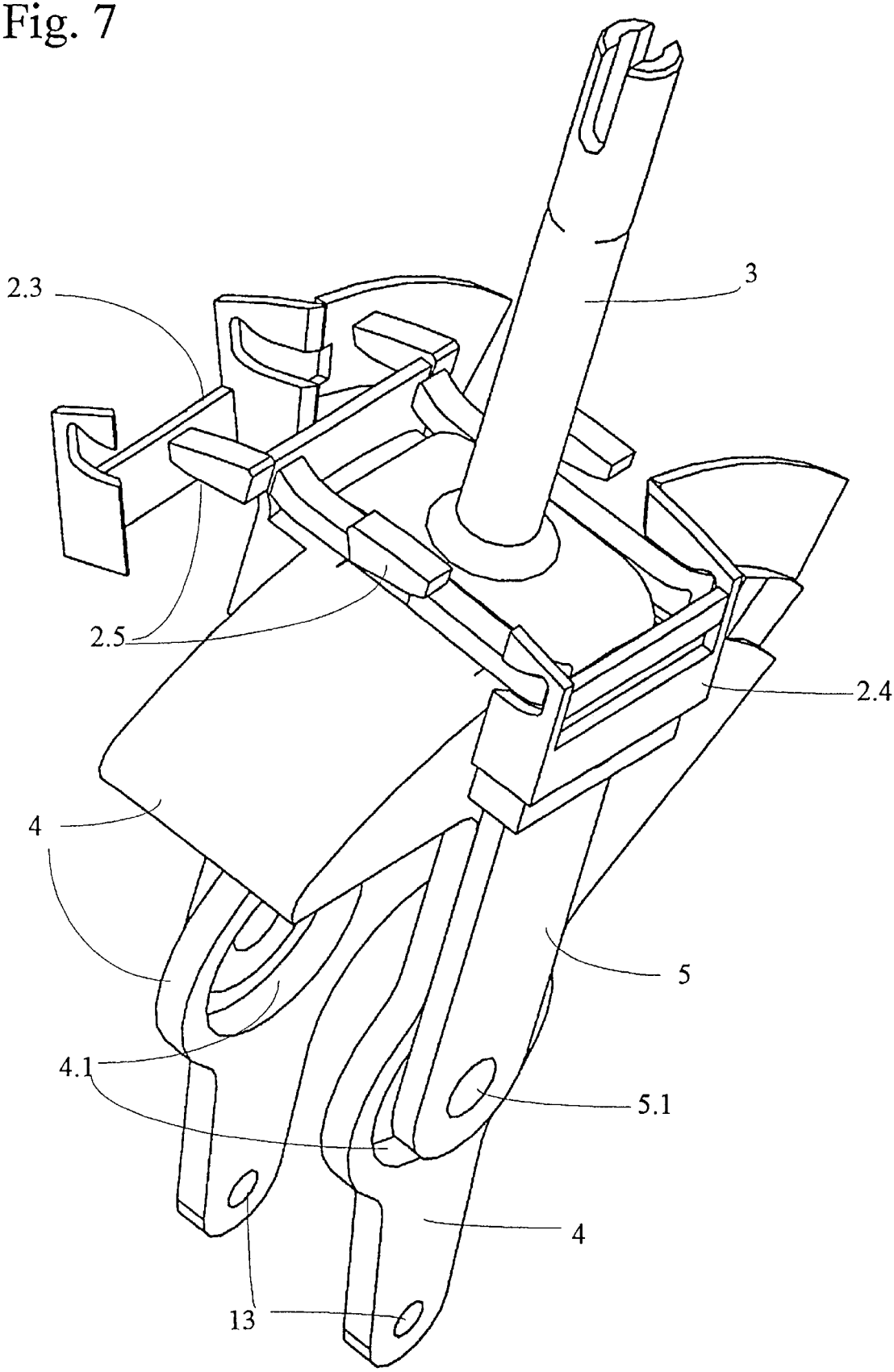

FIG. 7 shows a view similar to that in FIG. 6, but the selector lever 3 is pivoted laterally here and is in a middle position in relation to the pivoting movement around the second shift axis.

Figure 8:
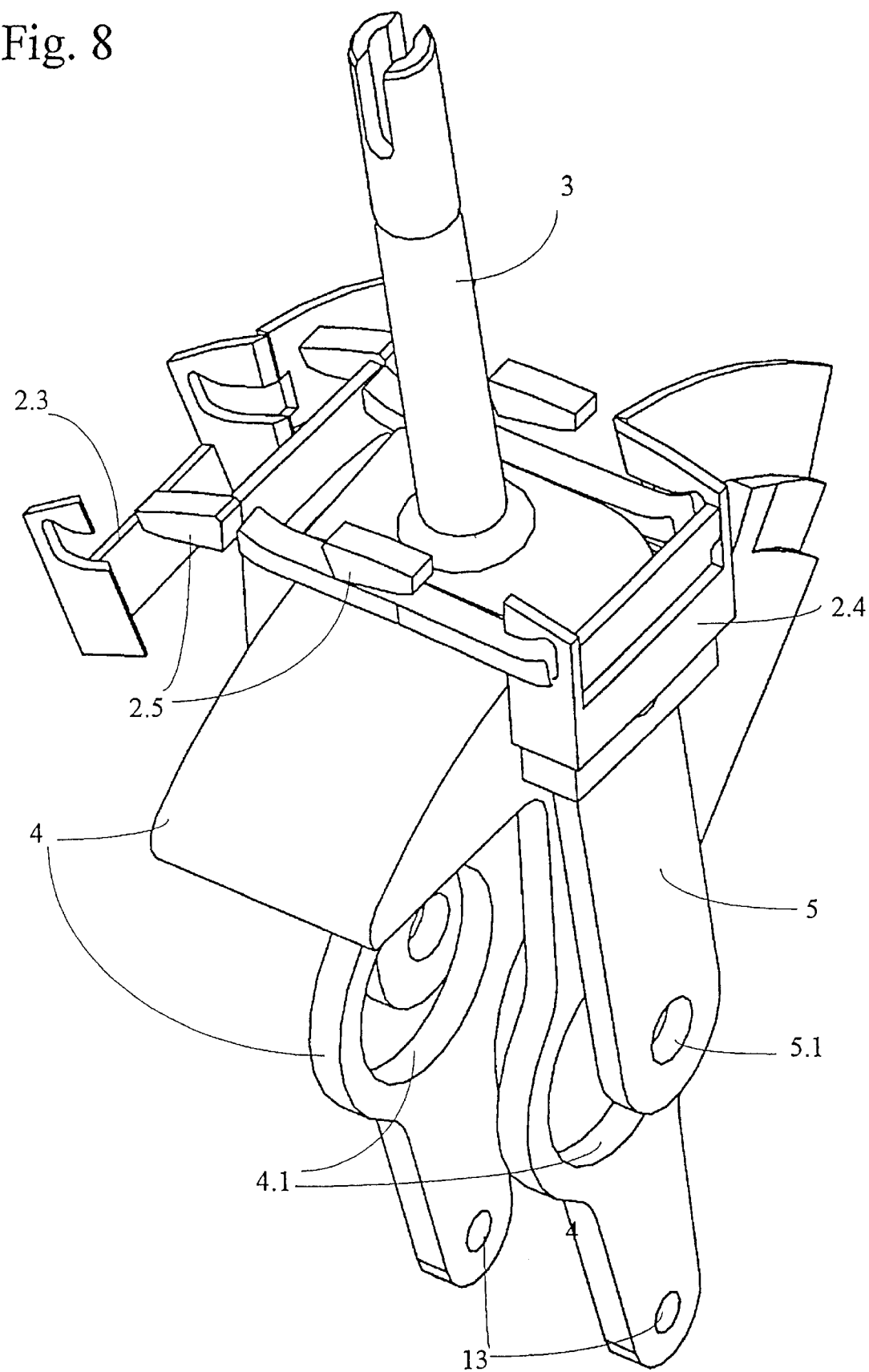

FIG. 8 shows how the selector lever 3 is deflected around the second shift axis in a sequence shift gate against the direction of the vehicle. It can be clearly recognized here that the axial openings 4.1 and 5.1 have positioned themselves eccentrically to one another.

Figure 9:
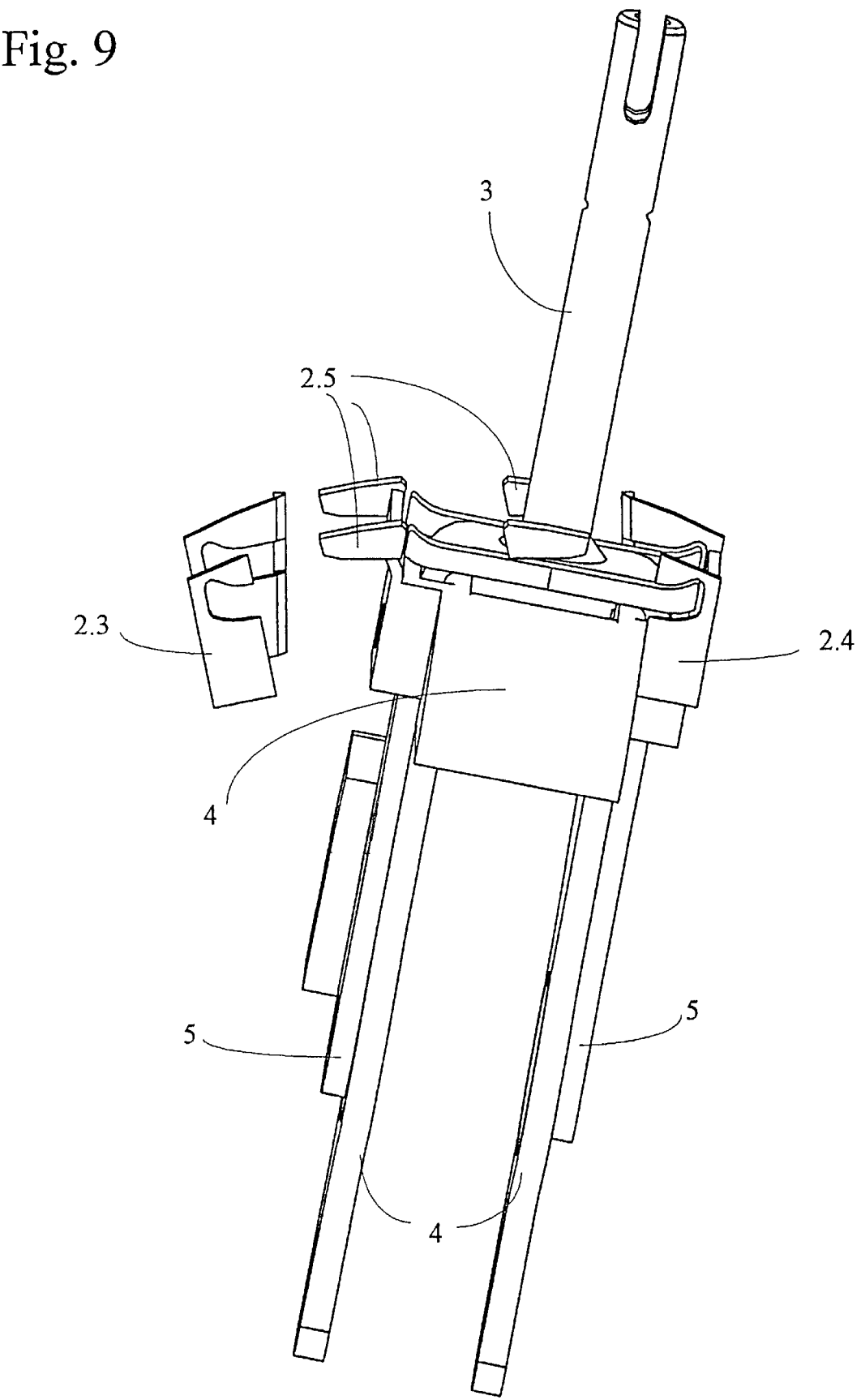

FIG. 9 shows the situation from FIG. 8 in a front view in the longitudinal direction of the vehicle.

Figure 10:
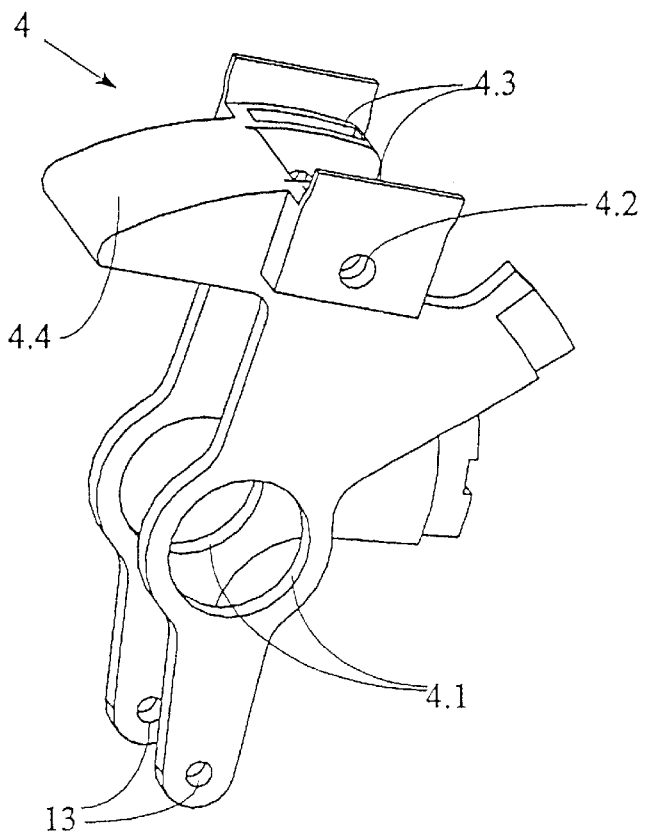
Figure 11:
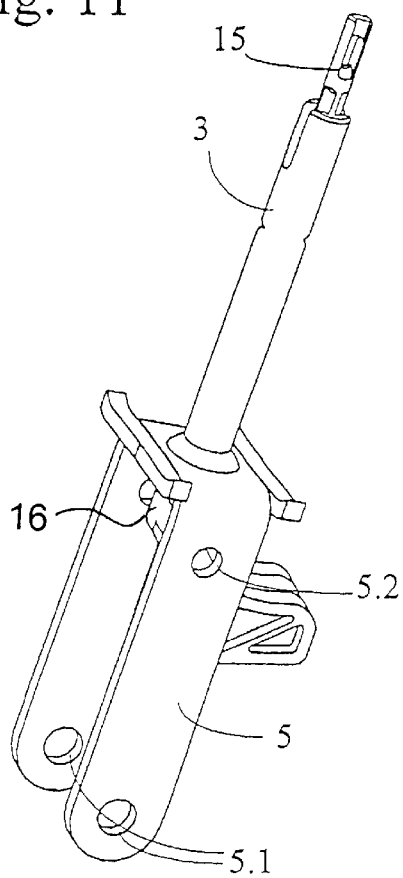
Figure 12:
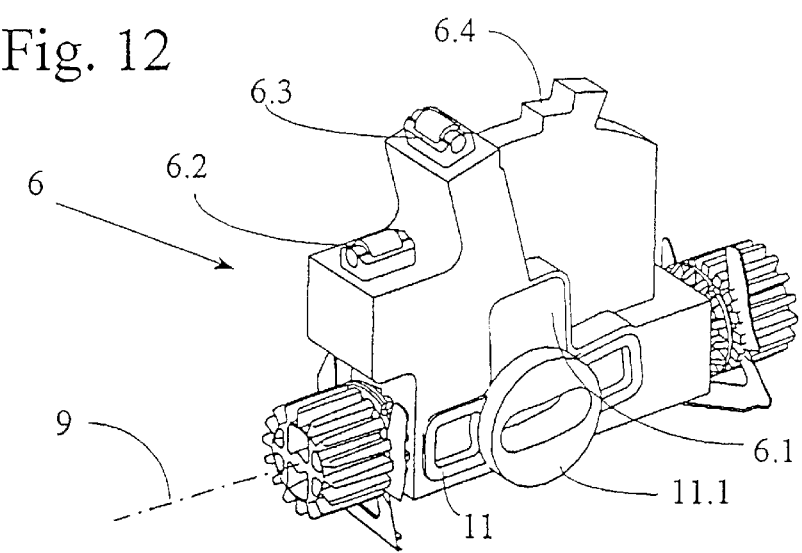

FIGS. 10 through 12 show the shifting device divided according to individual parts. FIG. 10 shows the inner bridge 4 with the axial opening 4.1 for the first shift axis 7 and the lever arm arranged under it with the cable junction 13. The axial opening 4.2 for the second shift axis 8 and two slots 4.3 arranged on both sides, through which the outer bridge 5 is inserted and is then connected to the inner bridge 4 rotatably movably via pushed-in pins, are arranged above the axial opening 4.1. A crossbeam 4.4, which has, invisibly here, a catch mechanism in the longitudinal direction of the vehicle and a catch mechanism in the transverse direction of the vehicle on the lower side, is located in the upper area.

FIG. 11 shows the outer bridge 5, which is connected to the selector lever 3 on the upper crossbeam. A tie rod 15, which cooperates with a locking bar 16, extends within the selector lever 3 in the known manner. The outer bridge 5 has an axial opening 5.1 in the lower area, into which the locking elements 12.1 and 12.2 are inserted, and it has an axial opening 5.2 in the upper area, into which a pin for establishing connection between the inner and outer bridges is inserted. The pin acts as a second shift axis 8.

FIG. 12 shows the central carrier 6 with the selector axis 9 and the laterally arranged openings 6.1 for the mounting insert 11. The mounting inserts 11 arranged on both sides have an axial element 11.1 each, which, usually made of a plastic, engages the axial opening 4.1 of the inner bridge 4. A locking cam 6.4, which can limit the movement of the selector lever 3 in the desired manner in cooperation with the tie rod 15 and the locking bar 16, is located on the top side of the central carrier 6 in the front area. Furthermore, a locking roller 6.2 and a locking roller 6.3 are arranged on the top side. The locking roller 6.2 is used to lock a sideways movement, while the locking roller 6.3 is used to lock a pivoting movement of the inner bridge in the direction of the vehicle.

To illustrate the idea of the present invention, FIGS. 13 through 17 show schematic representations of the movement spaces of the selector lever of the device according to the present invention and optionally of the movement gates arranged therein.

Figure 13:
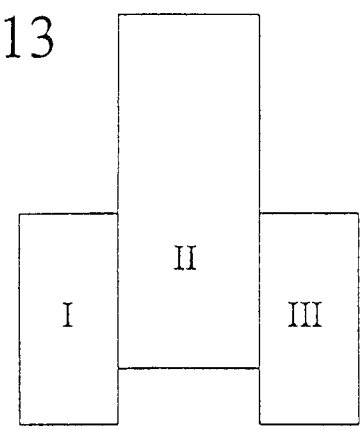
Figure 14:
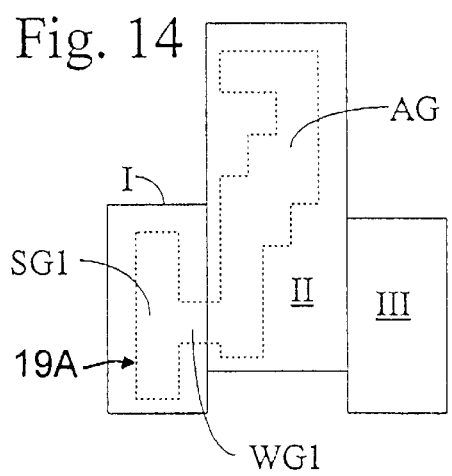
Figure 15:
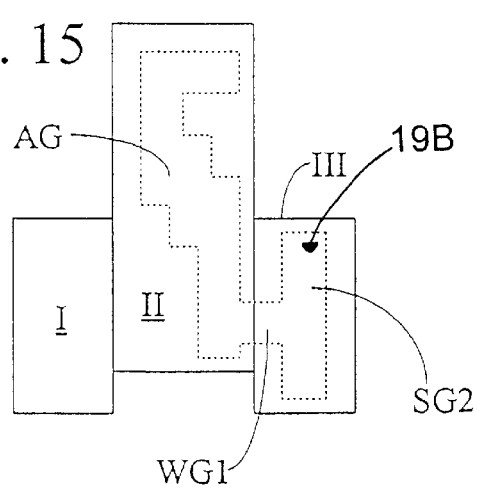
Figure 16:
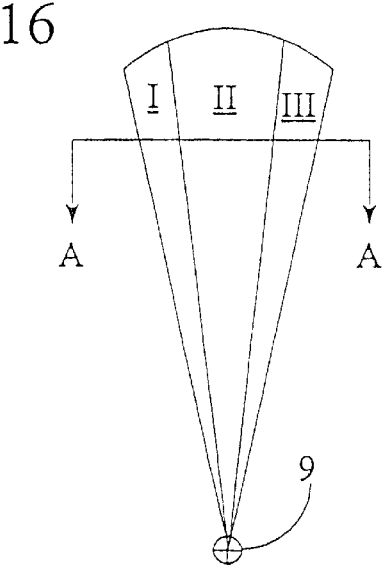
Figure 17:
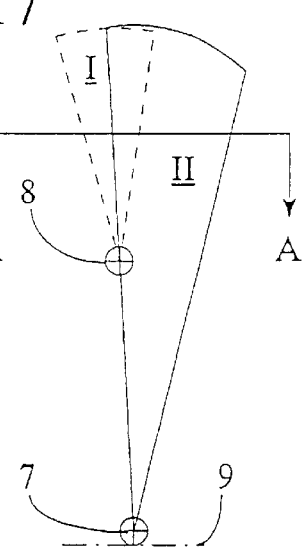

FIGS. 13 through 15 show a section A—A from FIGS. 16 and 17 and show the movement spaces of the example of a shifting device according to the present invention in one plane. FIG. 13 show the movement spaces I, II and III, whose top view consists of three rectangles arranged next to one another. The middle rectangle II corresponds to the movement space that can be assigned to an automatic shift gate, while the movement spaces I and III arranged on both sides, which are parallel to one another in their longitudinal orientation, represent the movement spaces that can be used for the sequence shift gate or optionally also for two different functions.

Figure 13A:
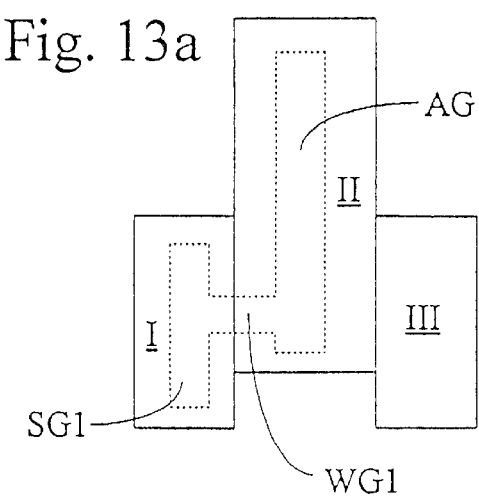

FIG. 13a shows as an example two shift gates, namely, the automatic shift gate AG and the sequence shift gate SG1, where the two shift gates are in connection with one another via the selector gate WG1. Such an embodiment of the shift gate is considered essential when a catch mechanism 6.4 corresponding to the example described in detail above is present in the automatic shift gate.

If the shifting device with the movement spaces being represented here is used in vehicles with different positions of the steering wheel (vehicles with the steering wheel on the right or on the left), the arrangement of the shift gates can be adapted to the positioning of the driver's seat in a simple manner, e.g., by replacing the cover. The modification in the shifting device proper, which is otherwise complicated, can be omitted.

FIGS. 14 and 15 show a corresponding example of a shifting device with the same movement spaces I through III. The difference between the two designs of a shifting devices in FIG. 14 and FIG. 15 is that gate portion such as a mirror-inverted cover or plate, defines movement gates 19A and 19B arranged correspondingly mirror-symmetrically for the selector lever is used.

FIG. 16 once again shows schematically a front view of the movement spaces I, II and III, while FIG. 17 shows a side view of the same movement spaces, FIG. 17 showing the positions, especially of the first shift axis 7 and of the second shift axis 8 as well as the position of the selector axis 9.

Figure 18:
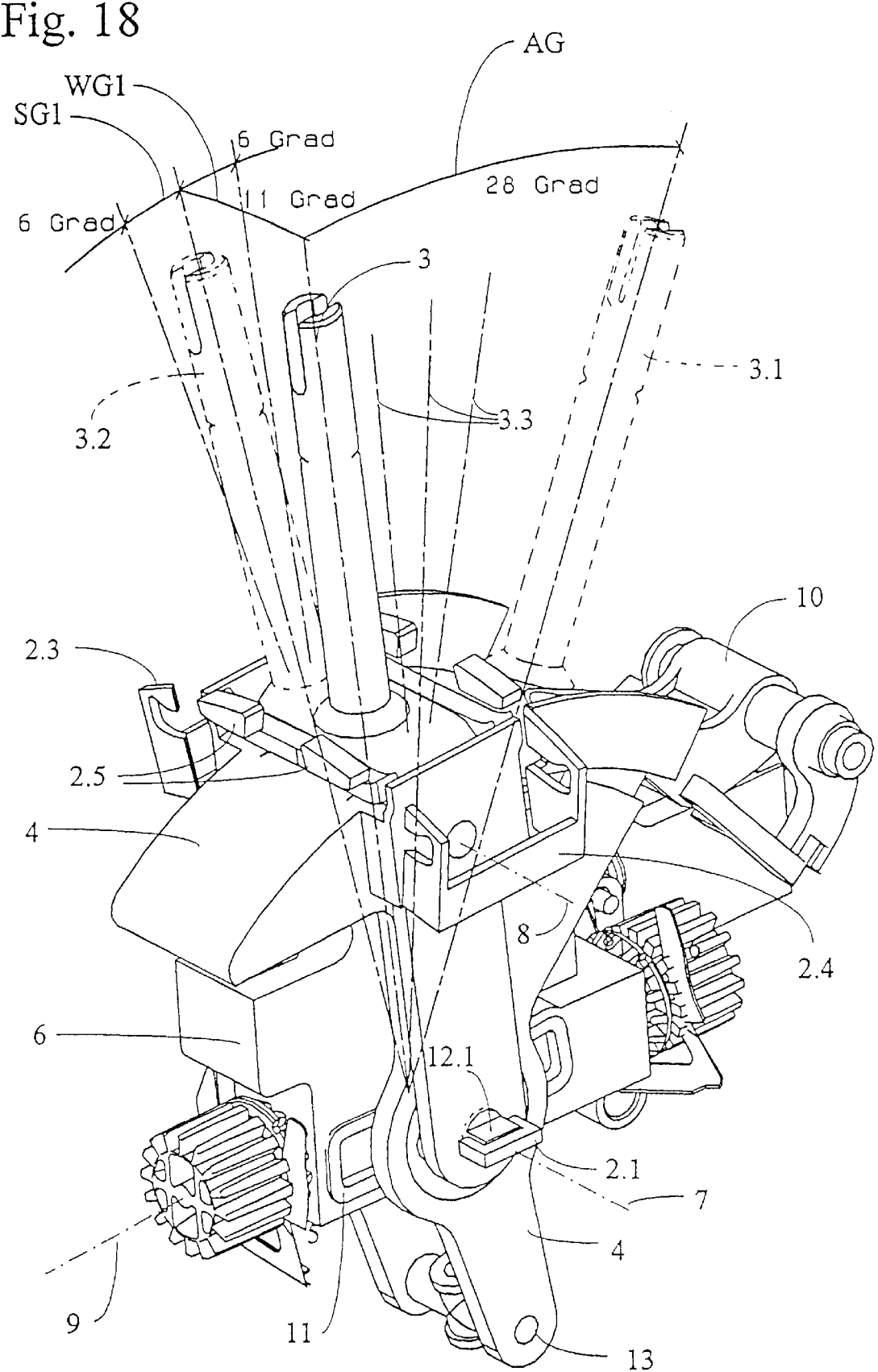

To illustrate the idea of the present invention even more, FIG. 18 shows the possible positioning of the selector lever, including the movement gates. This FIG. 18 shows a shifting device corresponding to FIG. 1 in the same view. The positioning of the bridges 4 and 5 and of the central carrier 6 as indicated shows the situation with the selector lever 3 in a middle position in the automatic shift gate. The two selector lever positions 3.1 and 3.2 additionally shown next to it show different movement situations of the selector lever. The selector lever position 3.1 corresponds to a position of the selector lever 3 in the automatic shift gate in the frontmost position (position "P"), while the selector lever is shown in position 3.2 in the position in which it is disengaged to the left into the sequence shift gate. Above the selector lever are shown the circle arc of the automatic gate AG with a deflection possibility by 28°, which can be swept by the selector lever and, to the side of it, the circle arc in the sequence shift gate SG1 with a deflection by plus/minus 6° around the second shift axis 8. The circle arc of the selector gate WG1, via which changeover between the automatic shift gate and the sequence shift gate is possible by moving the selector lever by an angle of 11° is possible, is located between the automatic shift gate AG and the sequence shift gate SG1.

The right-hand side of the possible positionings of the selector lever 3 in the right-hand sequence shift gate is additionally indicated by broken line with the reference number 3.3.

On the whole, the shifting device according to the present invention is consequently a shifting device that is suitable for an automatic transmission with sequence shifting possibility, where the identical shifting device can be used for a changeover between vehicles with the steering wheel on the right and on the left.

While specific embodiments of the invention have been shown and described in detail to illustrate the application of the principles of the invention, it will be understood that the invention may be embodied otherwise without departing from such principles.

What is claimed is:

1. A shifting device of a motor vehicle transmission, the shifting device comprising:

a selector lever;

an automatic shift gate and a sequence shift gate, the selector lever being movable in the automatic shift gate for selecting automatic gears and in the sequence shift gate for manually upshifting and downshifting gears;

moveable elements for transmitting selection movements to the motor vehicle transmission, the shifting device having three movement spaces located next to one another and directed essentially in parallel to one another, two adjacent said movement spaces being provided for different functions;

a movement shift gate limiting movement of said selector lever and forming only a single said automatic shift gate assigned to a middle one of said movement spaces, said movement shift gate forming only a single said sequence shift gate assigned to one of said outer movement spaces, said movement shift gate forming a connection gate between said automatic shift gate and said sequence shift gate.

2. A shifting device in accordance with claim 1, wherein a linkage is provided in at least one gate for transmitting the shifting movement of said selector lever to the motor vehicle transmission.

3. A shifting device in accordance with claim 1, wherein an electronic transmission device is provided in at least one shift gate, for transmitting the shifting movement of said selector lever to the motor vehicle transmission.

4. A shifting device in accordance with claim 1, further comprising a Key Lock system.

5. A shifting device in accordance with claim 1, wherein said moveable elements comprise:

a central carrier pivotable around a selection axis;

an inner bridge pivotably mounted on said central carrier and pivotable around a first shift axis extending essentially at right angles to said selection axis; and an outer bridge mounted and pivotable on said inner bridge around said second shift axis and connected to said selector lever.

6. A shifting device in accordance with claim 5, further comprising: at least one locking element engagement and at least one locking element provided to cooperate with said inner and outer bridges such that said at least one locking element and said at least one locking element engagement mutually engage one another in defined pivoted positions of said central carrier, while they are disengaged in other pivoted positions of said central carrier.

7. A shifting device in accordance with claim 6, wherein said first shift axis extends through said at least one locking element.

8. A shifting device in accordance with claim 6, wherein said at least one locking element, said at least one locking element engagement form a connection between said inner bridge and said outer bridge, which connection rotates in unison, in the case of mutual engagement.

9. A shifting device in accordance with claim 6, further comprising a shifting device housing, wherein said at least one locking element engagement, is connected to said shifting device housing.

10. A shifting device in accordance with claim 6, further comprising: a movement gate limiting movement of said selector lever.

11. A shifting device in accordance with claim 10, wherein said movement gate is fastened at least partially to said housing.

12. A shifting device in accordance with claim 10, wherein said movement gate is fastened at least partially to said inner bridge.

13. A shifting device in accordance with claim 10, wherein said movement gate is fastened at least partially to said outer bridge.

14. A device in accordance with claim 1, wherein:

said movement shift gate blocks movement of said selector lever into the other of said outer movement spaces;

movement of said selector lever in said two movement spaces performs substantially similar functions in the transmission.

15. A shifting device of a motor vehicle transmission, the shifting device comprising:

a selector lever;

an automatic shift gate and a sequence shift gate, the selector lever being movable in the automatic shift gate for selecting automatic gears and in the sequence shift gate for manually upshifting and downshifting gears;

moveable elements for transmitting selection movements to the motor vehicle transmission, the shifting device having three movement spaces located next to one another and directed essentially in parallel to one another, two adjacent said movement spaces being provided for different functions, said selector lever has a first shift axis in the automatic shift gate and a second shift axis is provided in the sequence shift gate, wherein said selector lever is movable around one of the shift axes only, depending on the shift gate selected.

16. A shifting device in accordance with claim 15, wherein said first and second shift axes are arranged eccentrically to one another.

17. A shifting device in accordance with claim 15, wherein said first and second shift axes are arranged in parallel to one another.

18. A shifting device in accordance with claims 15, wherein the distances between said first and second shift axes and a shift knob at the end of said selector lever, differ substantially.

19. A shifting device in accordance with claim 15, wherein said selector lever has a selection axis, which is directed approximately in a longitudinal direction of the vehicle and around which it is mounted pivotably.

20. A shifting device in accordance with claim 15, wherein a cable junction is provided in at least one gate for transmitting the shifting movement of said selector lever to the motor vehicle transmission.

21. A shifting device arrangement comprising:

a selector lever;

moveable elements connected to said selector lever and defining three movement spaces of said selector, said movement spaces being arranged substantially parallel to each other, two of said movement spaces being arranged on opposite sides of a middle said movement space, said movable elements transmitting individual movement of said selection lever in adjacent said movement spaces for different functions in a transmission;

a gate portion around said selector lever and defining a first shift gate corresponding with said middle movement space, said gate portion also defining a second shift gate corresponding with one of said two movement spaces, said gate portion defining a connection gate connecting said first shift gate and said second shift gate, said gate portion blocks movement of said selector lever into the other of said two movement spaces.

22. An arrangement in accordance with claim 21, wherein:

said first shift gate is an automatic shift gate for the transmission;

said second shift gate is a sequence shift gate for the transmission;

movement of said selector lever in said two movement spaces performs substantially similar functions in the transmission.

23. A device in accordance with claim 21, wherein:

said movable elements are connected to portions of a housing, said portions of said housing being connectable to a vehicle.

\* \* \* \* \*